United States Patent
Marupaduga et al.

(10) Patent No.: US 11,070,275 B1
(45) Date of Patent: Jul. 20, 2021

(54) SYSTEM AND METHOD FOR MANAGING SIGNAL TRANSMISSION CHARACTERISTICS IN A WIRELESS NETWORK

(71) Applicant: Sprint Spectrum LP, Overland Park, KS (US)

(72) Inventors: Sreekar Marupaduga, Overland Park, KS (US); Rajveen Narendran, Olathe, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 16/275,419

(22) Filed: Feb. 14, 2019

(51) Int. Cl.
*H04B 7/06* (2006.01)
*H04B 7/0413* (2017.01)

(52) U.S. Cl.
CPC ......... *H04B 7/0691* (2013.01); *H04B 7/0413* (2013.01)

(58) Field of Classification Search
CPC ... H04B 1/02; H04B 1/10; H04B 1/58; H04B 7/04; H04B 7/08; H04B 7/0413; H04B 7/0691; H04B 7/0857; H04L 1/00; H04L 25/03; H04L 27/00; H01Q 1/24; H01Q 3/26; H04W 16/28; H04W 52/244; H04W 72/04; H04W 72/14; H04W 72/082; H04W 74/00; H04W 88/06

USPC .............. 375/260, 267, 295, 316, 347, 350
See application file for complete search history.

(56) References Cited

U.S. PATENT DOCUMENTS

| | | | |
|---|---|---|---|
| 8,755,477 B1* | 6/2014 | Park ................... | H04B 7/0871 375/260 |
| 10,084,522 B2 | 9/2018 | Zhang et al. | |
| 2005/0064825 A1* | 3/2005 | Forrester ............ | H04B 7/0814 455/101 |
| 2012/0033761 A1* | 2/2012 | Guo ..................... | G01S 3/023 375/316 |
| 2016/0143055 A1* | 5/2016 | Nammi ............... | H04W 74/006 370/329 |
| 2016/0164593 A1 | 6/2016 | Lee et al. | |
| 2016/0226570 A1* | 8/2016 | Nicholls ............. | H04B 7/0897 |
| 2017/0195004 A1* | 7/2017 | Cheng ................ | H04B 7/0602 |
| 2020/0195296 A1* | 6/2020 | Sarkas ................ | H04B 1/525 |

* cited by examiner

*Primary Examiner* — Shawkat M Ali

(57) ABSTRACT

Systems, methods, and processing nodes are configured to manage transmission characteristics in a wireless network, such as a wireless network that employs MIMO techniques, by identifying an undesired signal, the undesired signal originating from a communication device external to the wireless network and determining that a signal parameter value of the undesired signal exceeds a threshold value. An operating parameter of a multi-element antenna for communicating signals in the wireless network is adjusted when it is determined that the signal parameter value exceeds a threshold value.

14 Claims, 10 Drawing Sheets

SYSTEM AND METHOD FOR MANAGING SIGNAL TRANSMISSION CHARACTERISTICS IN A WIRELESS NETWORK

TECHNICAL BACKGROUND

As wireless networks evolve and grow, there are ongoing challenges in communicating data across different types of networks. For example, a wireless network may include one or more access nodes, such as base stations, for providing wireless voice and data service to wireless devices in various coverage areas of the one or more access nodes. Wireless networks may be configured to utilize a single-user multiple-in multiple-out (SU-MIMO) operating mode and/or a multi-user (MU-MIMO) mode. In the SU-MIMO operating mode, multiple data streams are directed towards individual wireless devices. In the MU-MIMO operating mode, the multiple data streams can be directed towards plural wireless devices that are selected to participate in the MU-MIMO operating mode based on the orthogonality of transmission, thereby maximizing resources. In a recent evolution of MIMO technology, known as massive MIMO or large-scale MIMO, an access node may utilize hundreds of antennae to simultaneously transmit each of a plurality of different data streams to a corresponding plurality of wireless devices. Massive MIMO has been identified as one of the promising air interface technologies to address the massive capacity requirement required demanded by 5G networks.

However, MIMO systems, such as SU-MIMO, MU-MIMO, and massive MIMO using any form of MIMO, do have some drawbacks including being more susceptible to interference from signals radiating from other additional external communication sources within the operational range of the system. Similarly, MIMO systems may be more prone to producing interference signals that may impact the operation of those same external communication sources. Thus, there is a need to identify and manage the signal transmission characteristics of a MIMO system when potential signal interference issues exist that may affect the operational performance of other additional communication sources and networks that are external to the MIMO (e.g., massive MIMO) system.

Overview

Exemplary embodiments described herein include methods, systems, and processing nodes for managing signal transmission characteristics in a wireless network. An exemplary method includes identifying an undesired signal, the undesired signal originating from a communication device external to the wireless network, determining that a signal parameter value of the undesired signal exceeds a threshold value, and adjusting an operating parameter of a multi-element antenna for communicating signals in the wireless network when it is determined that the signal parameter value exceeds a threshold value.

An exemplary system includes an access node, the access node including one or more multi-element antennas for communicating in a wireless network, and a processing node coupled to the access node, the processing node identifying an interference signal, the interference signal originating from a communication device external to the wireless network, determining that a signal parameter value of the interference signal is above a threshold value, and providing a signal to the access node for adjusting an operating parameter of one of the one or more multi-element antennas for communicating signals in the wireless network when it is determined that the signal parameter value exceeds a threshold value.

An exemplary processing node includes a processor configured to identify an undesired signal, the undesired signal originating from a communication device external to the wireless network, determine that a signal parameter value of the undesired signal is above a threshold value, and provide instructions for adjusting an operating parameter of a multi-element antenna for communicating signals in the wireless network when it is determined that the signal parameter value exceeds a threshold value.

The above presents a simplified overview of the subject matter in order to provide a basic understanding of some aspects of subject matter embodiments. It is not intended to identify key/critical elements of the embodiments or to delineate the scope of the subject matter. Its sole purpose is to present some concepts of the subject matter in a simplified form as a prelude to the more detailed description that is presented later.

BRIEF DESCRIPTION OF THE DRAWINGS

These and other aspects, features, and advantages of the present disclosure will be described or become apparent from the following detailed description of the preferred embodiments, which is to be read in connection with the accompanying drawings.

Figure 1:
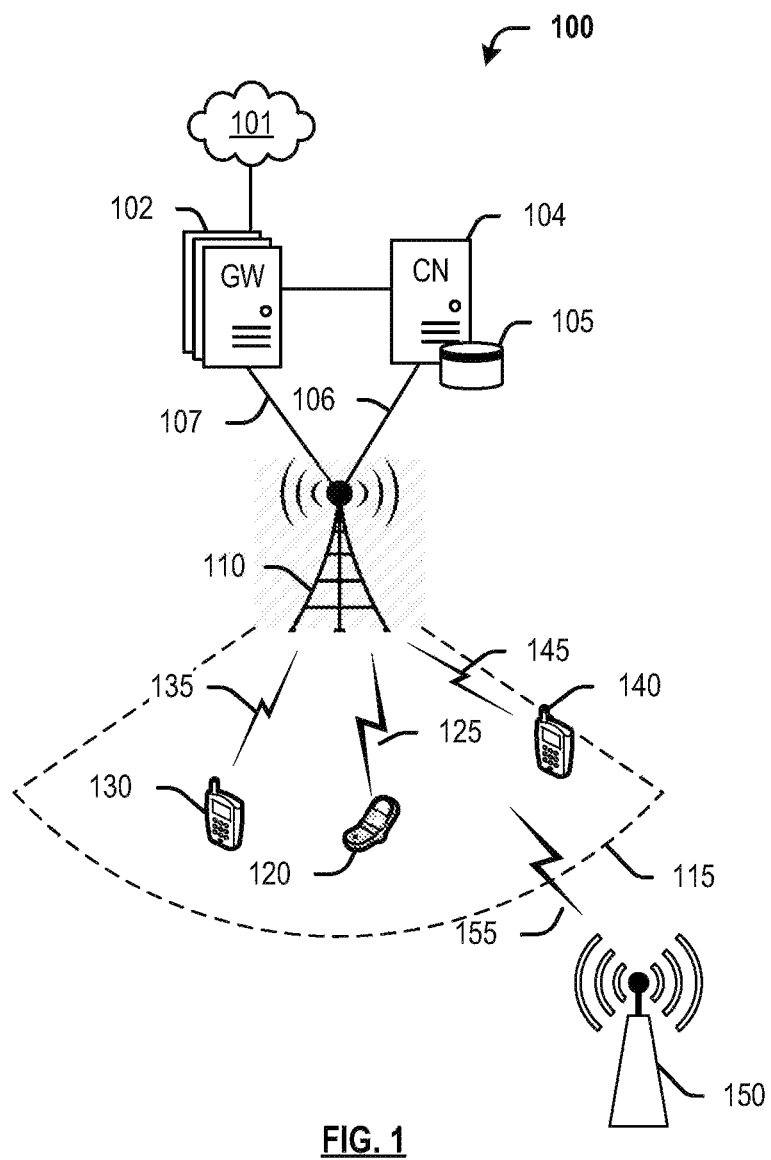
FIG. 1 depicts an exemplary system for managing signal transmission characteristics in wireless networks, such as networks configured to utilize MIMO.

It should be understood that the drawing(s) are for purposes of illustrating the concepts of the disclosure and are not necessarily the only possible configuration for illustrating the disclosure.

DETAILED DESCRIPTION

In some of the embodiments disclosed herein, a method or process is described that utilizes a mechanism or process for managing signal transmission characteristics of a system or device in a wireless network. The process includes identifying an undesired signal originating from an additional communication source or communication device that operates external to the wireless network, determining that a signal parameter value of the undesired signal exceeds a threshold value, and adjusting an operating parameter of a multi-element antenna or antenna array used for communicating signals in the wireless network when it is determined that the signal parameter value exceeds a threshold value. The process, when executed as part of a system or apparatus operating in the wireless network, particularly a wireless network that uses one or more principles of MIMO operation, can result in mitigation or elimination of interference to the operation of the communication device operating external to the wireless network as a result of transmission of communication signals from the system or apparatus in the wireless network.

In some embodiments, the multi-element antenna can be configured to operate in one of several MIMO operating modes in the wireless network including, but not limited to, SU-MIMO, MU-MIMO, and massive MIMO using any form of MIMO. Further, in some embodiments the multi-element antenna includes a first portion or section having a first set or subset that with a first number of elements used for communicating on the wireless network using a first communication protocol. For example, the first communication may be a Fifth Generation mobile networks or wireless systems (5G) protocol. It is important to note that, in some instances, the first set of elements constitute all of the elements of the multi-element antenna.

Further, in some embodiments, the multi-element antenna further includes another or second portion or section having a second set or subset of elements with a second number of elements. The elements in the second set of elements are different from the elements in the first set of elements. The second set of elements is used for communication on the same wireless network as the first set of elements but use a second communication protocol that is different from the first communication protocol. For example, this second communication protocol may be a Fourth Generation broadband cellular (4G) protocol.

In some embodiments, the undesired signal may be identified using some initial measurements or some other form of characterization for all signals received by the multi-element antenna. The undesired signals may be identified using some form of mathematical or statistical process or by a process of elimination in terms of identifying all signals associated with the wireless network. The identification of the undesired signal may also be provided to the system as input data, (either initially or on an ongoing basis) regarding signals and proximate networks in the region or area covered by the wireless network.

In some embodiments, prior to any adjustment as described above, the number of elements in the first set of elements and the number of elements in the second set of elements of the multi-element antenna or antenna array is the same. For example, the number of elements in each set may be 32.

In some embodiments, all or a portion of multi-element antenna is adjusted by reducing the first number of elements used for transmitting a signal, receiving a signal, or both transmitting and receiving a signal within the wireless network using the first protocol mentioned above. Further, in some embodiments, the first number of elements in the first set of elements is reduced by a factor that is a multiple of two. For example, initially and prior to any adjustment as described above, the multi-element antenna includes a total of 64 elements, the number of elements in the first set and operated with a first communication protocol is 32, and the number of elements in the second set and operated with the second communication protocol is 32 elements, the remaining 32 elements. Following the adjustment as described above, the number of elements that remain operational (i.e., used for transmitting and/or receiving) in the first set of elements with the first communication protocol may be 16 or any other factor of two of the original 32 elements. The remaining 16 or other number of elements from the first set are not operational (i.e., not used for transmitting and/or receiving).

In some embodiments, the adjusting of all or a portion of the multi-element antenna includes reducing the number of elements used for transmitting a communication signal while not reducing the number elements used for receiving a communication signal. For instance, as a result of adjusting the multi-element antenna, 16 antenna elements of the original 32 elements in the first set of elements remain operational for transmitting communication signals while all 32 elements of the first set of elements are still operational for receiving communication signals using the first communication protocol (e.g., 5G). Further in some embodiments, the opposite adjustment may be performed, reducing the number of elements used for receiving a communication signal and not reducing the number of elements used for transmitting a communication signal. In either case, the number of elements used for transmitting a communication signal is different from the number of elements used for receiving a communication signal.

In some embodiments, more than one value of the signal parameter for the undesired signal may be used in determining that the signal parameter value exceeds a particular threshold value. A plurality of values of the same signal parameter, measured or received over a period of time, may be used to determine if one or more of those signal parameter values exceeds the threshold value. The period of time may be user selectable or may be predefined. For example, the period of time may be adjustable from one second to one minute. The period of time may also include measuring or receiving the signal parameters on a random basis or a periodic basis during the period of time.

In some embodiments, one or more values of a plurality of signal parameters may be measured and used in determining whether one of more the values exceeds a threshold value. Each of the signal parameters may be different and each of the threshold values may further be different. For example, the signal parameter may be one or more of received signal strength (RSS) for the undesired signal, the frequency of the undesired signal, the bandwidth of the undesired signal, or any other appropriate and useful signal parameter. Further, the same period of time or different periods of time included as part of the determination for each signal parameter may be used as similarly described above.

As an additional mechanism, some form of statistical analysis may be incorporated with any of the signal parameters and/or signal parameter values that are taken over the period of time. One or more statistical values may be determined or calculated from any signal parameter values taken, measured, or received over a period of time. Any or all of these statistical values may be provided as the signal parameter value used in determining that the signal parameter value exceeds a threshold value.

Further, the multi-element antenna may one of a set of multi-element antennas, each on the set covering a radial sector outward from a fixed location (e.g., a communication tower that includes a communication system). In some embodiments, identifying the undesired signal includes identifying the undesired signal using a multi-element antenna in the set of multi-element antennas that is different from the multi-element antenna that is adjusted.

In some embodiments described herein, a system is used to perform one or more of the aspects of present disclosure described by the various embodiments. The system includes an access node including one or more multi-element antennas for communicating in a wireless network and a processing node coupled to the access node, the processing node identifying an interference signal with respect to the wireless network, the interference signal originating from a communication device external to the wireless network, determining that a signal parameter value of the undesired signal is above a threshold value, and providing a signal to the access node for adjusting an operating parameter of one or more multi-element antennas used for communicating signals in the wireless network when it is determined that the signal parameter value exceeds a threshold value. The access node may include additional electrical elements used in conjunction with general wireless communication technology as well as specific electrical elements necessary for operation in specific types of wireless communication networks. The processing node further may include one or more processors as well as other elements necessary to perform the operations as described above.

In some embodiments described herein, a processing node may be included to perform one or more of the aspects of the disclosure described by the various embodiments. The processing node may include one or more processors configured to identify an undesired signal, the undesired signal originating from a communication device external to the wireless network, determine that one or values of one or more signal parameters of the undesired signal is above a threshold value, and provide instructions for adjusting an operating parameter of a multi-element antenna for communicating signals in the wireless network when it is determined that the signal parameter value exceeds a threshold value. The processing node may include additional elements, including but not limited to, a data storage element, and a memory for storing program instructions. The memory or similar element may provide the program instructions to the one or more processors in order to execute the various mechanisms described in the embodiments described herein.

These and additional operations are further described with respect to the embodiments depicted in FIGS. 1-10 below.

FIG. 1 depicts an exemplary system 100 for managing signal transmission characteristics in wireless networks including wireless networks configured to utilize MIMO operation (e.g., SU-MIMO, MU-MIMO, and massive MIMO using any form of MIMO). System 100 comprises a communication network 101, gateway node(s) 102, controller node 104, access node 110, wireless devices 120, 130, 140, and additional communication source 150. Access node 110 is illustrated as deploying a sector 115, with wireless devices 120, 130, 140 being located within sector 115 and accessing network services from access node 110. Access node 110 can be any network node configured to provide communication between end-user wireless devices 120, 130, 140 and communication network 101, including standard access nodes and/or short range, low power, small access nodes. For instance, access node 110 may include any standard access node, such as a macrocell access node, base transceiver station, a radio base station, an eNodeB device, an enhanced eNodeB device, a next generation or gigabit NodeB device (gNB) in 5G networks, or the like. In other embodiments, access node 110 can be a small access node including a microcell access node, a picocell access node, a femtocell access node, or the like such as a home NodeB device or a home eNodeB device. It is also noted that access node 110 is illustrated as incorporated as part of a communication tower. However, access node 110 may be incorporated in any number of structures including, but not limited to, a residential or commercial dwelling, a utility pole, a bridge, and the like.

By virtue of comprising a plurality of antennae configured as a multi-element antenna or an antenna array as further described herein, access node 110 may deploy or implement multiple-input-multiple-output (MIMO) modes, such as SU-MIMO or MU-MIMO modes as well as similar massive MIMO modes. In an exemplary embodiment, access node 110 may utilize hundreds of antennae to simultaneously transmit each of a plurality of different data streams (such as MIMO data streams 125, 135, and 145) to a corresponding plurality of wireless devices (such as wireless devices 120, 130, and 140 respectively). Moreover, it is noted that while one access node 110 is illustrated in FIG. 1, any number of access nodes can be implemented within system 100.

The plurality of antennae that make up the multi-element antenna or antenna array also receive data streams, including MIMO data streams, (125, 135, 145) for the corresponding plurality of wireless devices (120, 130, 140). In addition, the plurality of antennae may receive a signal 155 transmitted from additional communication source 150 within the range of distance covered by sector 115. Signal 155 is a signal that is not part of communication within the wireless network controlled by access node 110 and may therefore be considered an undesired signal or interference signal to the wireless network.

In operation, system 100, using one or more of the elements described herein, identifies an interfering signal 155 originating from additional communication source 150 and considered to be undesired to the wireless network. System 100 further determines that a signal parameter value of the undesired signal 155 exceeds a threshold value and adjusts an operating parameter of an antenna array in access node 110 when it is determined that the signal parameter value exceeds a threshold value.

In some embodiments, the antenna array in access node 110 may include a first set or subset of elements used for communicating on the wireless network using a first communication protocol. For example, the first communication protocol may be a 5G protocol. The first set of elements may constitute all of the elements of the antenna array in access node 110.

Further, in some embodiments, the antenna array in access node 110 may further include another portion or section that has a second set or subset of elements that are different from the first set or subset of elements. The second set or subset of elements are used for communication on the wireless network using a second communication protocol. For example, this second communication protocol may be a 4G protocol.

In some embodiments, all or a portion of the antenna array in access node 110 may be adjusted by reducing the number of elements used for transmitting a signal, receiving a signal, or both transmitting and a receiving a signal with the network using the first protocol mentioned above. Further, in some embodiments, the number of elements in all or a portion of the antenna array in access node 110 (e.g., the first set of elements) is reduced by a factor that is a multiple of two. For example, a 64 element antenna array in access node 110 may initially use 32 elements for operating with the first communication protocol and the 32 remaining elements for operating with the second communication protocol. Following the adjustment, the number of elements used for operating the first communication protocol may be 16 or any other factor of two of the initial 32 elements.

In some embodiments, the adjusting of the antenna array in access node 110 may include reducing the number of elements used for either transmitting a communication signal or receiving a communication, but not both at the same time. For instance, as a result of adjusting the antenna array in access node 110, 16 antenna elements from the initial 32 elements (e.g., in the first of elements) are operational for transmitting communication signals while all of the initial 32 elements are still operational for receiving communication signals using the first communication protocol (e.g., 5G).

In some embodiments, access node 110 or some other processor in system 100 may measure or use more than value of the signal parameter value for the undesired signal determining that these signal parameter values exceed a particular threshold value. A plurality of values of the same signal parameter, measured or received over a period of time, may be used to determine if one or more of those signal parameter values exceeds the threshold value. The period of time may be predefined or user selectable (e.g., from one second to one minute). The period of time may include measuring or receiving the signal parameters on a random basis or a periodic basis during the period of time.

In some embodiments, access node 110 or some other processor in system 100 may include one or more values of a plurality of signal parameters in determining whether one of more the values exceeds a threshold value. Each of the signal parameters may be different and each of the threshold values may further be different. For example, the signal parameter may be one or more of received signal strength (RSS) for the undesired signal, the frequency of the undesired signal, the bandwidth of the undesired signal, or any other appropriate and useful signal parameter. Further, the same period of time determination mechanism as described above may be used with the more than one signal parameter.

Further, some form of statistical analysis may be incorporated with any of the signal parameters that are taken over the period of time. One or more statistical values may be determined or calculated from any signal parameter values taken, measured, or received over a period of time. Any or all of these statistical values may be provided as the signal parameter value used in determining that the signal parameter value exceeds a threshold value. Any or all of the calculations and/or determinations may be made in a processor or processing node included in access node 110 or in any other node (e.g., the controller node 104) that can include a processing node and can communicate with access node 110.

As an example of aspects of operation in system 100, the RSS reading associated with an identified undesired signal 155 transmitted from additional communication source 150 is measured, causing a rise of 5 to 15 decibels (dB) in nominal RSS measurement level and further contributing to overall RSS noise levels of greater than −100 dB referenced to 1 milliwatt of power (dBm) at access node 110. As RSS threshold level has been set in access node 110 at a value of −100 dBm. As a result of determining that the RSS level associated with undesired signal 155 exceeds the RSS threshold level, adjustment of an operating parameter of the multi-element antenna in access node 110 (e.g., a reduction in the number of elements operating in the first communication mode) is made.

In some embodiments, the undesired signal may be identified using some initial measurements or some other form of characterization for all signals received by plurality of antennae in access node 110. The undesired signals may be identified using some form of mathematical or statistical process or by a process of elimination in terms of identifying all signals associated with the wireless network served by access node 110. The identification of the undesired signal may also be provided to the system as input data, either initially or on an ongoing basis, that includes information regarding signals and proximate networks in the region or area covered by the wireless network.

It is important to note that adjusting an operating parameter of a multi-element antenna, such as by reducing the number of elements used in a portion of the multi-element antenna, can result in mitigation or elimination of interference to the operation of additional communication source 150 external to the wireless network due to the transmission of signals from access node 110 in system 100.

Access node 110 may comprise a processor and associated circuitry to execute or direct the execution of computer-readable instructions to perform operations such as those further described herein. Briefly, access node 110 may retrieve and execute software from storage, which may include a disk drive, a flash drive, memory circuitry, or some other memory device, and which may be local or remotely accessible. The software comprises computer programs, firmware, or some other form of machine-readable instructions, and may include an operating system, utilities, drivers, network interfaces, applications, or some other type of software, including combinations thereof. Further, access node 110 may receive instructions and other input at a user interface. Access node 110 communicates with gateway node 102 and controller node 104 via communication links 106, 107. Access node 110 may communicate with other access nodes (not shown) using a direct link such as an X2 link or similar.

Wireless devices 120, 130, 140 may be any device, system, combination of devices, or other such communication platform capable of communicating wirelessly with access node 110 using one or more frequency bands deployed therefrom. Wireless devices 120, 130, 140 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access node 110. Other types of communication platforms are possible.

Communication network 101 may be a wired and/or wireless communication network, and may comprise processing nodes, routers, gateways, and physical and/or wireless data links for carrying data among various network elements, including combinations thereof, and may include one or more of a local area network a wide area network, and an internetwork (including the Internet). Communication network 101 may be capable of carrying data including, but not limited to, data to support voice, push-to-talk, broadcast video, and data to support wireless network protocols by wireless devices 120, 130, and 140. Wireless network protocols may comprise multimedia broadcast multicast services (MBMS), code division multiple access single carrier radio transmission technology (CDMA 1×RTT), Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX), 4G, LTE Advanced, 5G, 5G New Radio ("5G NR"), or 5G LTE. Wired network protocols that may be utilized by communication network 101 comprise Ethernet, Fast Ethernet, Gigabit Ethernet, Local Talk (such as Carrier Sense Multiple Access with Collision Avoidance (CSMA/CD)), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 may use various communication media, such as air, space, metal, optical fiber, or some other signal propagation path including combinations thereof. Communication links 106, 107 may be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Communication links 106, 107 may include Si communication links. Other wireless protocols can also be used. Communication links 106, 107 can be a direct link or might include various equipment, intermediate components, systems, and networks. Communication links 106, 107 may comprise many different signals sharing the same link Gateway node(s) 102 may be any network node(s) configured to interface with other network nodes using various protocols. Gateway node(s) 102 may communicate user data over system 100. Gateway node(s) 102 may be a standalone computing device, computing system, or network component, and may be accessible using a communication interface connection (e.g., a wired or wireless connection), or through an indirect connection such as through a computer network or communication network. For example, gateway node(s) 102 may include a serving gateway (SGW) and/or a public data network gateway (PGW), etc. One of ordinary skill in the art would recognize that gateway node(s) 102 is not limited to any specific technology architecture, such as LTE or 5G NR, and may be used with any network architecture and/or protocol.

Gateway node(s) 102 may comprise a processor and associated circuitry to execute or direct the execution of computer-readable instructions to obtain information. Gateway node(s) 102 may retrieve and execute software from storage, which can include a disk drive, a flash drive, memory circuitry, or some other memory device, and which can be local or remotely accessible. The software may include, among other things, computer programs, firmware, or some other form of machine-readable instructions, and may include an operating system, utilities, drivers, network interfaces, applications, or some other type of software, including combinations thereof. Gateway node(s) 102 may also receive instructions and other input through some type of a user interface (not shown).

Controller node 104 may be any network node configured to communicate information and/or control information over system 100. Controller node 104 may be configured to transmit control information associated with a handover procedure. Controller node 104 may be a standalone computing device, computing system, or network component, and may be accessible using a communication interface connection (e.g., a wired or wireless connection), or through an indirect connection such as through a computer network or communication network. For example, controller node 104 may include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as LTE or 5G NR, and can be used with any network architecture and/or protocol.

Controller node 104 may comprise a processor and associated circuitry to execute or direct the execution of computer-readable instructions to obtain information. Controller node 104 may retrieve and execute software from storage, which may include a disk drive, a flash drive, memory circuitry, or some other memory device, and which may be local or remotely located but accessible from that remote location. In an exemplary embodiment, controller node 104 includes a database 105 for storing information related to capabilities of wireless devices 120, 130, 140, including MIMO capabilities, real-time and/or historic information related to throughput of access node 110, sector 115, etc. This information may be requested by or shared with access node 110 via connections 106, 107, or other communication connections, such as X2 connections, and so on. The software comprises computer programs, firmware, or some other form of machine-readable instructions, and may include an operating system, utilities, drivers, network interfaces, applications, or some other type of software, and combinations thereof. Controller node 104 may also receive instructions and other input through some form of a user interface (not shown).

Additional communication source 150 may be any signal source or signal transceiver that operates at wireless or radio frequencies. In some cases, additional communication source 150 may be an access node or communication tower for any sector or cell for the same wireless network with some level of overlapping coverage or for a competing wireless network. In this case, it is also possible that additional communication source 150 operates in the same frequency range as the frequency range used by access node 110 (e.g., 900-1000 MHz or 1700-1800 MHz). In other cases, additional communication source 150 may be a wireless transceiver device operating in a commercial, regulatory, or military licensed frequency range near the operating frequency range used by access node 110. In still other cases, additional communication source 150 may be some form of, possibly low power, beacon communication base station that operates over a broad range of frequencies including the frequency range used by access node 110. Additional communication source 150 further may be any other possible type of device that may be susceptible to external interference signals in certain frequency ranges, especially from focused beam pattern signal transmissions that are possible using MIMO techniques.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Further, the processing methods, systems, devices, networks, access nodes, and equipment described above may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: access node 110, controller node 104, and/or network 101. In some embodiments, all or portions of the software programs that control the operations of access node 110, controller node 104, and/or gateway node(s) 102 may be stored external to these devices or stored in the cloud. The software is then downloaded for external storage or the cloud to the devices, as needed, a network, such as communication network 101.

Figure 2:
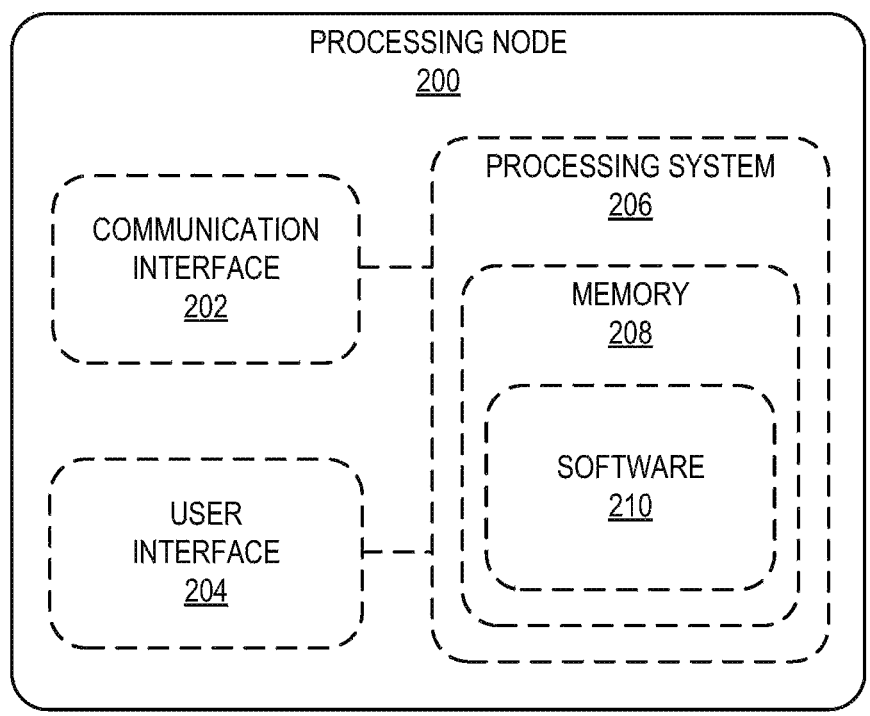
FIG. 2 depicts an exemplary processing node for managing signal transmission characteristics in wireless networks, such as networks configured to utilize MIMO.

FIG. 2 depicts an exemplary processing node 200 used in a communication system, such as system 100 depicted in FIG. 1. Processing node 200 comprises a communication interface 202, user interface 204, and processing system 206 in communication with communication interface 202 and user interface 204. Processing node 200 may be included as part of several elements of system 100 depicted in FIG. 1 including, but not limited to, gateway node(s) (102), controller node 104, and access node 110. Processing node 200 may also be included in other elements that have not been depicted as part of system 100 but which may be included as part of the operation of a communication system similar to system 100 depicted in FIG. 1. Processing node 200 may further include other components such as a power management unit, a control interface unit, etc., which have been omitted here for clarity.

In processing node 200, a processing system 206 includes storage 208. Storage 208 may store software 210 which is used in the operation of the processing node 200 as well as any data needed or produced by processing system 206. Storage 208 may include one or more of disk drives, flash drives, data storage circuitry, or some other memory devices. Storage 208 may also include at least one memory element configured as a buffer.

Software 210 may include one or more computer programs, firmware, or some other form of machine-readable instructions, including an operating system, utilities, drivers, network interfaces, applications, or some other type of software. For example, software 210 may include a coherence determination software module. Processing system 206 may include a microprocessor and other circuitry to retrieve and execute software 210 from storage 208.

Communication interface 202 permits processing node 200 to communicate with other network elements, such as the elements included in gateway node(s) 102, controller node 104, and access node 110 described in FIG. 1. User interface 204 permits the configuration and control of the operation of processing node 200 and may further provide information (e.g., visual or aural information) regarding the operations or status of processing node 200 or other elements and devices in communication with processing node 200.

In operation and among other performed functions, processing node 200 uses processing system 206 to identify an undesired signal, the undesired signal originating from a communication device external to the wireless network, such as additional communication source 150 described in FIG. 1. The undesired signal may interfere with the operation of wireless network that is served by a communication system (e.g., system 100 described in FIG. 1) that includes processing node 200. Processing node 200 may further determine that one or more signal parameter values of the undesired signal is above a threshold value. Processing node 200 may also perform any other measurements or calculations that are necessary for the determination and as have been described earlier in FIG. 1. Processing node 200 may also store any results, intermediate or otherwise, from the calculations or determinations performed in memory 208. Processing node 200 may further provide instructions, through communication interface 202, for adjusting an operating parameter of a multi-element antenna (e.g., antenna array in access node 110 in FIG. 1) for communicating signals in the wireless network when it is determined that the signal parameter value exceeds a threshold value. The instruction may include, among other things, commands to reduce the number of elements used for transmission and/or reception of communication signals in the portion of the multi-element antenna. Some or all of the instructions for executing these and other aspects of the operation of processing node 200 may be stored and retrieved from software 210. It is important to note many of the same variations of embodiments described earlier in FIG. 1 may similarly be applicable to the operation of processing node 200.

Figure 3:
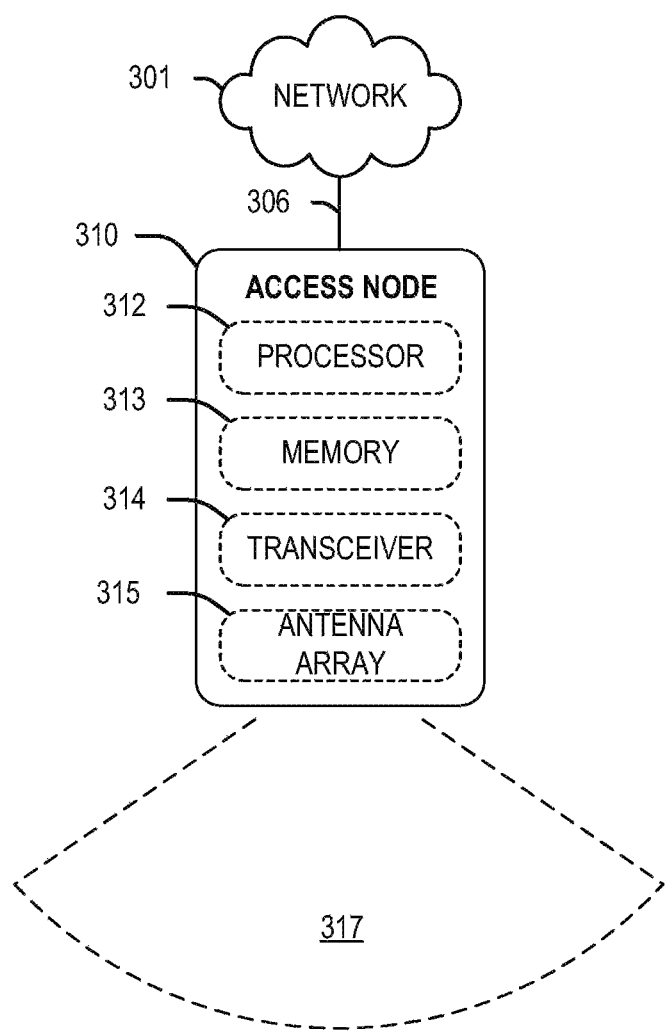
FIG. 3 depicts an exemplary access node for managing signal transmission characteristics in wireless networks, such as networks configured to utilize MIMO.

FIG. 3 depicts an exemplary access node 310 used in a communication system, such as system 100 depicted in FIG. 1. Access node 310 is configured as an access point for providing network services between network 301, through components such as gateway nodes and controllers (not shown), to end-user wireless devices, such as wireless devices 120, 130, 140 in FIG. 1, in a sector 317. Access node 310 is illustrated as comprising a processor 312 for executing the logical modules, a memory 313 for storing logical modules that perform operations described herein, and a transceiver 314 for transmitting and receiving signals via antenna array 315. Further, access node 310 is communicatively coupled to network 301 via communication interface 306, which may be any wired or wireless link as described above.

In general, access node 310 operates in a manner similar to that described for access node 110 described in FIG. 1 including all of the embodiments including various aspects of operation. More specifically, access node 310 uses a combination of processor 312, memory 313, transceiver 314, and antenna array 315 to control and manage various aspects of signal transmission characteristics of a wireless communication system, such as system 100 described in FIG. 1. In an embodiment, memory 313 comprises one or more logical modules or program modules that are executed by processor 312 to enable access node 310 to receive a signal or instructions (e.g., at processor 312 through network 301) from a processing node or other processing device located external to access node 300 to adjust an operating parameter of some aspect of the operation of one or more elements of antenna array 315. Access node 310 then adjusts an operating parameter for all or a portion of antenna array 315 through a control signal, in some cases using transceiver element 314 and/or provided by processor 312, when it is determined that the signal parameter value exceeds a threshold value. The operating parameter may include, among other things, enabling or disabling one or more antenna elements in antenna array 315 for transmission and/or reception of signals used as part of communicating with wireless devices (not shown) located in sector 317 as part of the wireless network.

In some embodiments, access node 310 may be part of a system for managing signal transmission characteristics in a wireless network configured to utilize a MIMO operating mode. In these embodiments, access node 310 may also include a processing node (e.g., processing node 200 described in FIG. 2) which is configured to perform operations including identifying an undesired signal, the undesired signal originating from a communication device external to the wireless network and determining that a signal parameter value of the undesired signal is above a threshold value. An operating parameter for a portion of antenna array 315 is adjusted, in some cases using control information from transceiver 314, when it is determined that the signal parameter value exceeds a threshold value.

Figure 4:
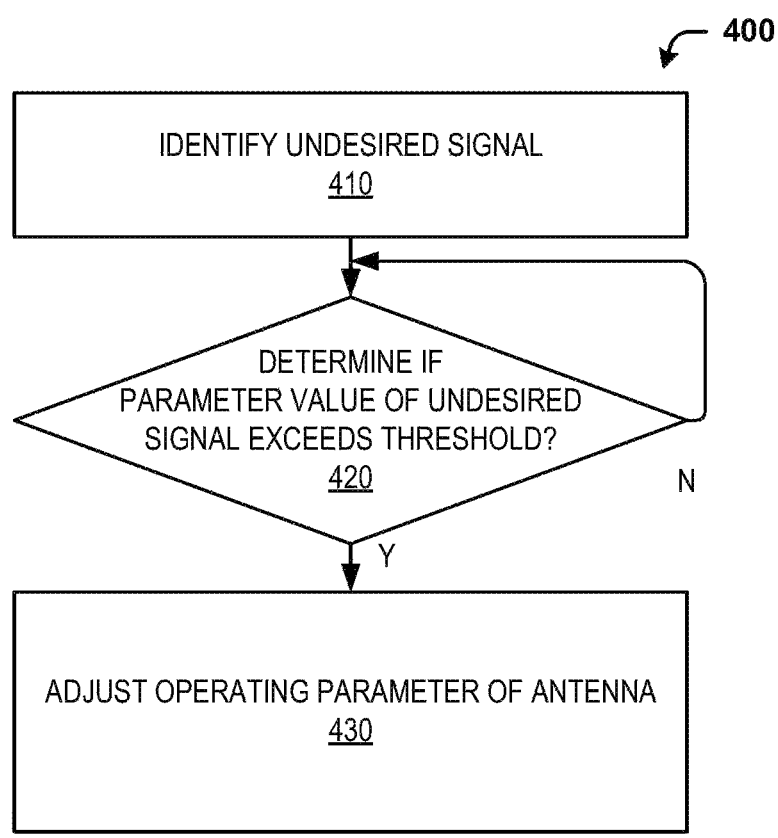
FIG. 4 depicts an exemplary process for managing signal transmission characteristics in wireless networks, such as networks configured to utilize MIMO.

FIG. 4 depicts an exemplary process 400 for managing signal transmission characteristics in wireless networks. Process 400 may be particularly suite for managing signal transmission characteristics in wireless networks employing MIMO operation, such as SU-MIMO, MU-MIMO, and massive MIMO using any form of MIMO. Process 400 is primarily described with respect to an access node, such as access node 310 described in FIG. 3. The access node may also include a processing node, such as processing node 200 described in FIG. 2. Process 400 may also be performed by an access node as configured and depicted in FIG. 1 (i.e., access node 110) or performed by a combination of elements depicted in FIG. 1, such as access node 110 and controller node 104. In other embodiments, the method can be implemented with any suitable network element. Although process 400 depicts steps performed in a particular order for purposes of illustration and discussion, the operations discussed herein are not limited to any particular order or arrangement. One skilled in the art, using the disclosures provided herein, will also appreciate that one or more of the steps of process 400 may be omitted, rearranged, combined, and/or adapted in various ways.

At step 410, a signal originating from an additional communication source, such as additional communication source 150 described in FIG. 1, is identified. The additional communication source is not connected or associated to the communication network served by access node 310 and is therefore considered an undesired signal source or an interference signal source. Similarly, any signals associated with the wireless network served by or associated to access node 310 may also be considered undesired or interfering signals to a communication network served by the additional communication source.

The undesired signal may be identified, at step 410, using some initial measurements or some other form of characterization for all signals received by antenna array 315 in access node 310. The undesired signals may be identified using some form of mathematical or statistical process or by a process of elimination in terms of identifying signals associated with the wireless network served by access node 310. Information associated with the identification of the undesired signal, step 410, may also be provided to the system as input data, either initially or on an ongoing basis, that includes information regarding signals and proximate networks in the region or area covered by the wireless network.

At step 420, a determination is made as to whether one or more signal parameter values associated with the presence of the undesired or interfering signal from the external or additional communication source. The determination, at step 420, may include measuring the one or more signal parameter values in access node 310 (e.g., in transceiver 314) or in another element of the communication system. The determination, at step 420, may alternatively or additionally include receiving information pertaining to the one or more signal parameter values over a separate network, such as network 301 or network 101 described in FIG. 1.

In some embodiments, one or more values of a plurality of signal parameters may be measured and used in determining whether one of more the values exceeds a threshold value. Each of the signal parameters may be different and each of the threshold values may further be different. For example, the signal parameter may be one or more of RSS for the undesired signal, frequency of the undesired signal, bandwidth of the undesired signal, or any other appropriate and useful signal parameter.

In some embodiments, a series of values for the same signal parameter or a plurality of signal parameters, measured or received over a period of time, may be used to determine, at step 420, whether one or more signal parameter values exceeds the threshold value. The period of time may be predefined, variable, and or may be user definable/adjustable. The period of time may further include measuring or receiving the one or more signal parameters on a random basis or a periodic basis. For instance, one or more signal parameters may be measured periodically at one second intervals for one minute.

The determining, at step 420, may further incorporate some form of statistical analysis with any of the signal parameters that are taken, measured, or received over the period of time. One or more statistical values may be determined or calculated from any signal parameter values taken, measured, or received over a period of time. Any or all of these statistical values may be provided as the final signal parameter value used in determining that the signal parameter value exceeds a threshold value.

If, at step 420, the determined value for the one or more signal characteristics exceeds the threshold value, then, at step 430, an operating parameter of an antenna, such as antenna array 315 in access node 310 or a multi-element antenna used with access node 110 in FIG. 1, is adjusted. The adjustment may be carried out by a combination of transceiver 314 controlling antenna array 315 in access node 310. Control information or instructions may also be generated in access node 310 (e.g., in processor 312) or in any other processor or processing node (e.g., processing node 200) in the communication system and provided to access node 310.

In some embodiments, the adjusting the portion of the antenna at step 430 includes reducing the number of antenna elements of the antenna used for receiving and/or transmitting a signal using a communication protocol (e.g., 5G) in the wireless communication network associated with and served by access node 310. Further, in some embodiments, the first number of elements is reduced by a factor that is a multiple of two. Other adjustments to the antenna array are also possible, including those adjustments described above.

It is important to note that, in some embodiments, the antenna (e.g., antenna array 315) may include a portion or section that has a set or subset of elements that are used for communication signals associated with access node 310 but used for communication on the wireless network using a second communication protocol. For example, this second communication protocol may be a 4G protocol.

Further, after completion of adjusting the operating parameter of the portion of the antenna array at step 430, process 400 may return to step 420 and continue measuring and determining whether one or more signal parameter values associated with the presence of the interfering signal from the external or additional communication source in order to verify that the signal parameter values are no longer above the threshold value. If the signal parameter values are still above the threshold, then process 400 may continue to further adjust the operating parameter of the portion of the antenna array at step 430.

If, at step 420, the value for the one or more signal characteristics does not exceed the threshold value, then method 400 returns to step 420 in order to continue monitoring (e.g., measuring and receiving) signal parameter values and determining if the signal parameter values exceed threshold values. In some embodiments, looping back to the determining, at step 420, may be performed continuously. In some embodiments looping back includes only periodically executing the determining, at the step 420. For instance, the step of determining, at step 420 may be performed at one minute intervals.

It is important to note that more than one undesired and potentially interfering signal may be identified. Further, an additional undesired and potentially interfering signal may be identified during any operation of process 400. It is to be understood that any additional identified and potentially interfering signal may be evaluated in process 400 either in combination with all other undesired signals or as separate process threads of process 400.

Figure 5:
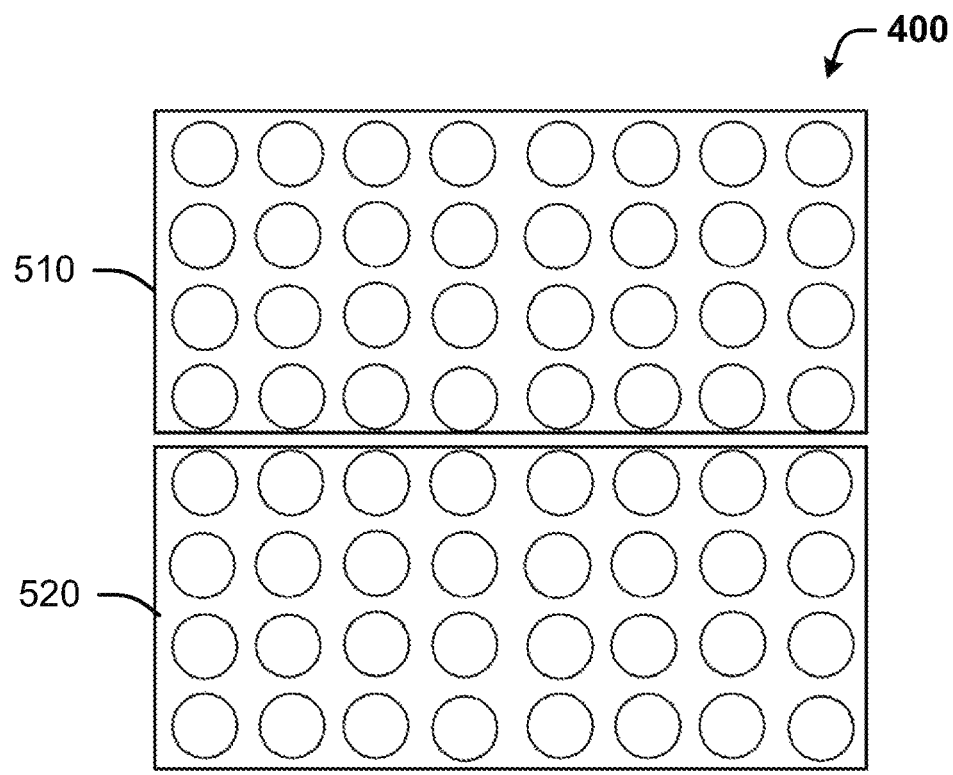
FIG. 5 depicts an exemplary antenna in a signal communication configuration as part of managing signal transmission characteristics in wireless networks, such as networks configured to utilize MIMO.

FIG. 5 depicts an exemplary antenna 500 in a signal communication configuration as part of managing signal transmission characteristics in wireless networks. Antenna 500 may be configured as an antenna array, such as one of the antenna array 315, configured to utilize MIMO operation in conjunction with access node 310 in FIG. 3. Antenna 500 may also be configured as an antenna array in conjunction with access node 110 in system 100 depicted in FIG. 1 or configured as an antenna array to use with any communication system employing MIMO communication techniques, particularly those associated SU-MIMO, MU-MIMO, and massive MIMO using any form of MIMO communication to a plurality of wireless devices. Antenna 500 may be considered as operating in an initial operating condition prior to any adjustment using the elements described for process 400 described in FIG. 4.

Antenna 500 illustrates an array of 64 individual antenna elements used for both transmission and reception of signals in conjunction with a transceiver element, such as transceiver 314, as part of an access node, such as access node 310. Antenna 500 is arranged into two subgroups of antenna elements, subgroup 510 and subgroup 520, two from two arrays of 32 elements. Each of subgroups 510 and subgroup 520 are used in the same communication system but each transmit and receive using a different communication protocol. In one embodiment, subgroup 510 communicates using a 5G protocol and subgroup 520 transmits using a 4G protocol.

Figure 6:
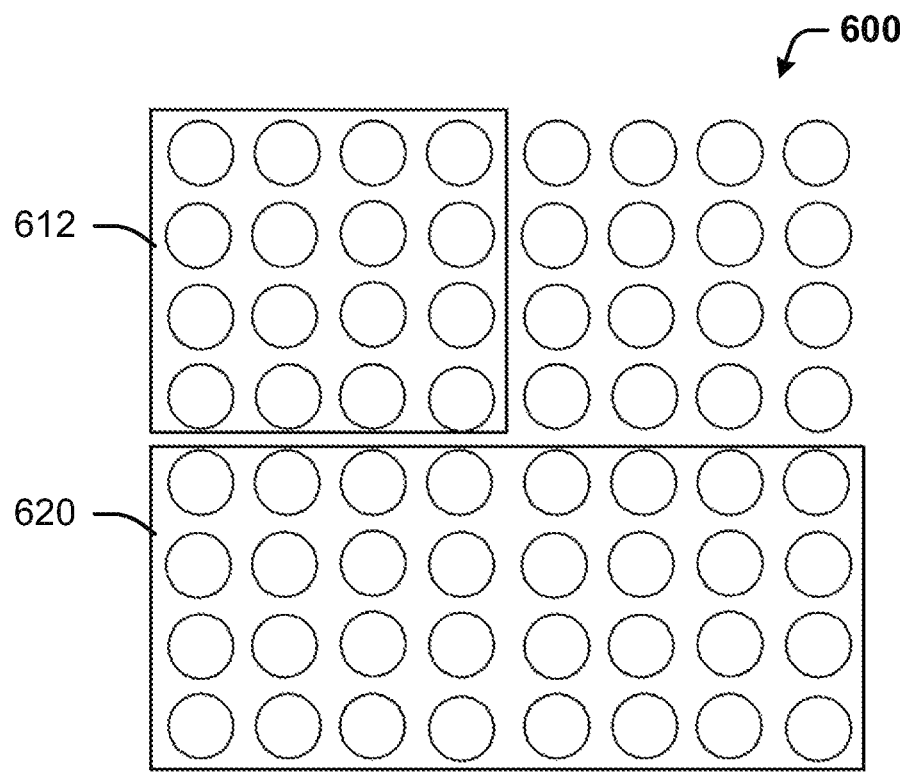
FIG. 6 depicts an exemplary antenna in another signal communication configuration as part of managing signal transmission characteristics in wireless networks, such as networks configured to utilize MIMO.

FIG. 6 depicts an exemplary antenna 600 in another signal communication configuration as part of managing signal transmission characteristics in wireless networks. Antenna 600 may be configured as an antenna array, such as one of the antenna array 315, configured to utilize MIMO operation in conjunction with access node 310 in FIG. 3. Antenna 600 may also be configured as an antenna array in conjunction with access node 110 in system 100 depicted in FIG. 1 or configured as an antenna array to use with any communication system employing MIMO communication techniques, particularly those associated SU-MIMO, MU-MIMO, and massive MIMO using any form of MIMO communication to a plurality of wireless devices. Antenna 600 may be considered as operating in a first exemplary operating condition following adjustment using the elements described for process 400 described in FIG. 4.

Antenna 600 illustrates an antenna array of 64 individual antenna elements with the operational elements arranged into two subgroups of antenna elements, subgroup 612 and subgroup 620. Subgroup 620 operates in a manner similar to that described for subgroup 520 in FIG. 5. Subgroup 612 similarly operates in the same communication system as subgroup 620 but operates using a different communication protocol than is used with subgroup 620, the same communication protocol as for operation of subgroup 510 in FIG. 5. Subgroup 612 has been adjusted or reduced to only use 16 of the original 32 elements that were operated as subgroup 510 in FIG. 5. The reduction in elements may be performed by one or more of several different mechanisms including enabling or disabling elements in antenna 600 under control of a transceiver or as part of an access node.

By configuring subgroup 612 of antenna 600 to operate with 16 elements instead of 32 elements, the antenna gain of subgroup 612 may be reduced or lowered by approximately 3 dB. The lower antenna gain may also reduce or lower the effective incident radiated power (EIRP) of subgroup 612 as well as increase the effective or widen the transmission beamwidth of subgroup 612. As a result, the effective transmission range of any communication signals transmitted using subgroup 612 of antenna 600 will be reduced or lowered by approximately one half of the original transmission range. The reduction in the effective transmission range will result in either partial or complete mitigation of any interference to communication signals associated with other communication sources that are external to the wireless network, such as additional communication source 150 described in FIG. 1.

Figure 7:
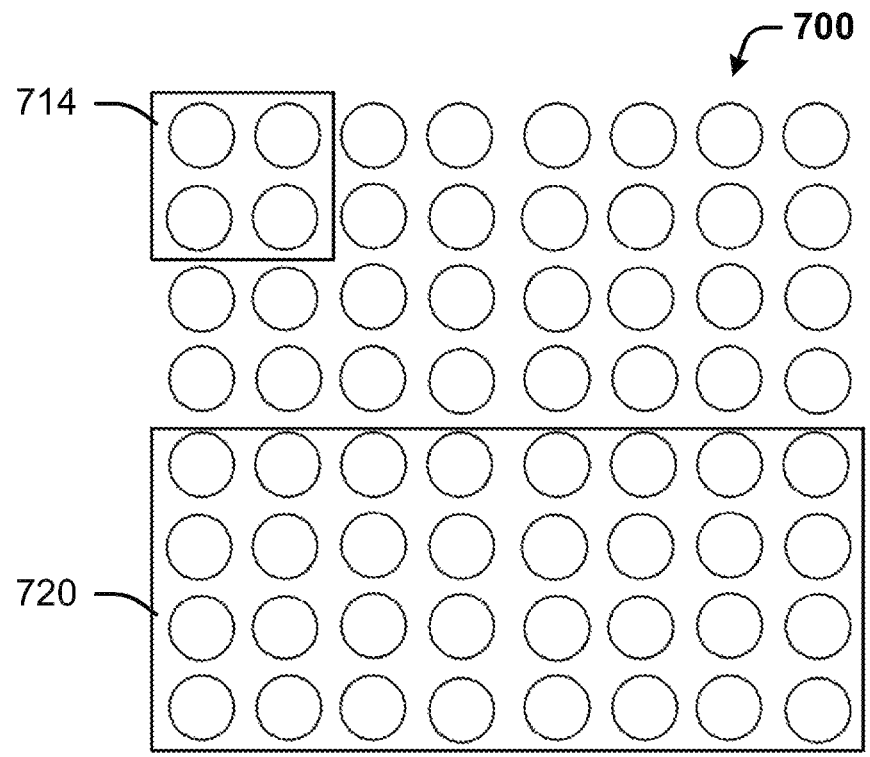
FIG. 7 depicts an exemplary antenna in a further signal communication configuration as part of managing signal transmission characteristics in wireless networks, such as networks configured to utilize MIMO.

FIG. 7 depicts an exemplary antenna 700 in a further signal communication configuration as part of managing signal transmission characteristics in wireless networks. Antenna 700 may be configured as an antenna array, such as one of the antenna array 315, configured to utilize MIMO operation in conjunction with access node 310 in FIG. 3. Antenna 700 may also be configured as an antenna array in conjunction with access node 110 in system 100 depicted in FIG. 1 or configured as an antenna array to use with any communication system employing MIMO communication techniques, particularly those associated SU-MIMO, MU-MIMO, and massive MIMO using any form of MIMO communication to a plurality of wireless devices. Antenna 700 may be considered as operating in a second exemplary operating condition following adjustment using the elements described for process 400 described in FIG. 4.

Antenna 700 illustrates an array of 64 individual antenna elements with operational elements arranged into two subgroups of antenna elements, subgroup 714 and subgroup 720. Subgroup 720 operates in a manner similar to that described for subgroup 520 in FIG. 5. Subgroup 714 similarly operates in the same communication system as subgroup 720 but operates using a different communication protocol than is used with subgroup 720, the same communication protocol as for operation of subgroup 510 in FIG.

5. Subgroup 714 has been adjusted or reduced to operate using only 4 of the original 32 elements that were operated as subgroup 510 in FIG. 5. The reduction in elements may be performed by one or more of several different mechanisms including enabling or disabling elements in antenna 700 under control of a transceiver or as part of an access node.

By configuring subgroup 714 of antenna 700 to operate with 4 elements instead of 32 elements, the antenna gain of subgroup 714 may be reduced or lowered by approximately 9 dB. The lower antenna gain may also reduce or lower the effective incident radiated power (EIRP) of subgroup 714 as well as increase the effective or widen the transmission beamwidth of subgroup 714. As a result, the effective transmission range of any communication signals transmitted using subgroup 714 of antenna 800 will be reduced or lowered by approximately one eighth of the original transmission range. The reduction in the effective transmission range will result in either partial or complete mitigation of any interference to communication signals associated with other communication sources that are external to the wireless network, such as additional communication source 150 described in FIG. 1.

Figure 8:
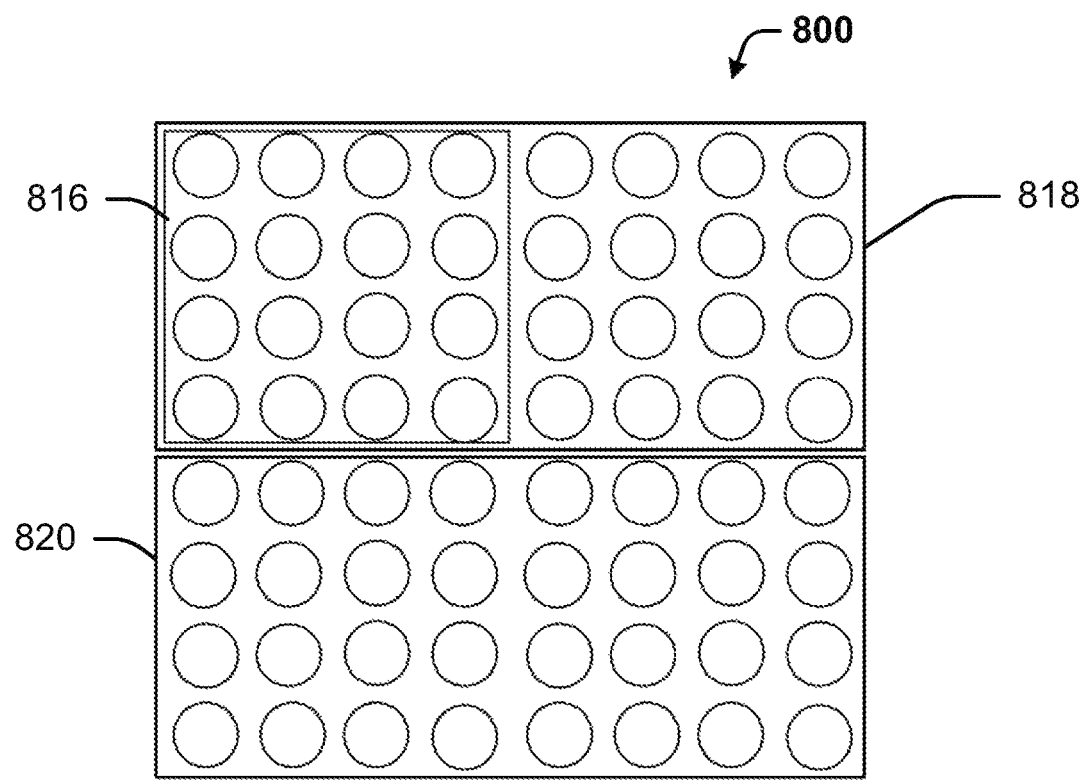
FIG. 8 depicts an exemplary antenna array in still another signal communication configuration as part of managing signal transmission characteristics in wireless networks, such as networks configured to utilize MIMO.

FIG. 8 depicts an exemplary antenna 800 in a further signal communication configuration as part of managing signal transmission characteristics in wireless networks. Antenna 800 may be configured as an antenna array, such as one of the antenna array 315, configured to utilize MIMO operation in conjunction with access node 310 in FIG. 3. Antenna 800 may also be configured as an antenna array in conjunction with access node 110 in system 100 depicted in FIG. 1 or configured as an antenna array to use with any communication system employing MIMO communication techniques, particularly those associated SU-MIMO, MU-MIMO, and massive MIMO using any form of MIMO communication to a plurality of wireless devices. Antenna 800 may be considered as operating in a third exemplary operating condition following adjustment using the elements described for process 400 described in FIG. 4.

Antenna 800 illustrates an array of 64 individual antenna elements are capable of being used for both transmission and reception of signals in conjunction with a transceiver element with the operational elements arranged into three subgroups of antenna elements, subgroup 816, subgroup 818, and subgroup 820. Subgroup 820 operates in a manner similar to that described for subgroup 520 in FIG. 5. Both subgroup 816 and subgroup 818 similarly operate in the same communication system as subgroup 820 but operates using a different communication protocol than is used with subgroup 820, the same communication protocol as for operation of subgroup 510 in FIG. 5. Subgroup 816 has been adjusted or reduced to 16 elements for the original 32 elements and operate as elements capable of both transmitting and receiving communication signals. Subgroup 818 includes the 16 elements included in subgroup 816 as well as the remaining 16 elements from original subgroup 510 in FIG. 5. The remaining 16 elements may still operate as elements capable of receiving communication signals but not transmitting communication signals. As a result, subgroups 816 and 818 represent an adjustment or reduction of transmission elements in antenna 800 with no adjustment or reduction in reception element in antenna 800. Any reduction in elements may be performed by one or more of several different mechanisms including enabling or disabling elements in antenna 800 under control of a transceiver or as part of an access node.

By configuring subgroup 816 of antenna 800 to operate in a transmission mode with 16 elements instead of 32 elements, the antenna gain of 816 may be reduced or lowered by approximately three dB and will operate with the performance characteristics in transmission mode similar to those describe for subgroup 612 of antenna 600 described in FIG. 6. However, by configuring subgroup 818 of antenna 800 to operate in a reception mode with all of the original 32 elements, no change in antenna gain or any other characteristics of operation will occur with signal reception capability. As a result, antenna 800 may be able to partially or completely mitigate interference to signals from other communication sources while maintain the ability to receive signals to the original full reception range for communication devices in the network. It is important to note that, although not described here in detail, it is possible to also configure an antenna operating with more elements for signal transmission than are operated for reception using the principles and mechanisms described above.

Figure 9:
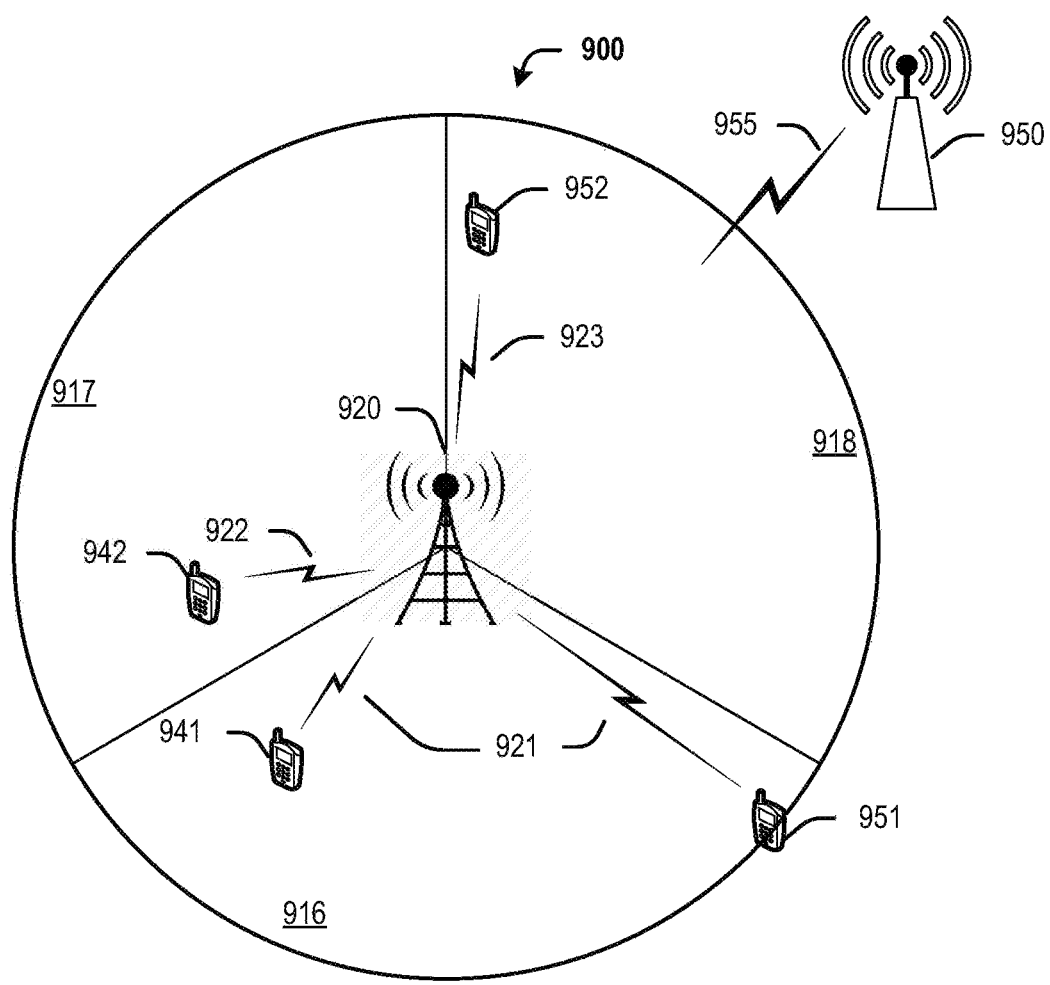
FIG. 9 depicts an exemplary system employing a plurality of sectors deployed by an access node and managing signal transmission characteristics in wireless networks, such as networks configured to utilize MIMO.

FIG. 9 depicts an exemplary system 900 employing a plurality of sectors deployed by an access node and managing signal transmission characteristics in wireless networks. System 900 includes many features and elements that operate in a manner similar to that of system 100 depicted in FIG. 1 but not shown here (e.g., gateway nodes, controller node, communication network) and is particularly suited for operating in networks configured to utilize MIMO (e.g., SU-MIMO, MU-MIMO, etc.). System 900 further includes an access node 920 deploying three sectors 916, 917, and 918 operating with three separate antenna arrays (not shown) in access node 920. Wireless devices 941 and 951 are illustrated as being located within sector 916, wireless device 942 is illustrated as being located within sector 917, and wireless device 952 is illustrated as being located within sector 918. Each sector 916, 917, 918 covers a separate, generally non-overlapping, portion of a circumference radially outward from the access node 920. For example, each sector 916, 917, 918 cover an approximately 120 degree arc portion of the circumference radially outward from access node 920. In other embodiments, other sectorization schemes, including more or less sectors, along with corresponding multi-element antennas, are possible.

An additional communication source 950 is located proximate to sector 918 and may be produce an interference signal, as a result of transmission of communication signal 955, to devices in sector 918 (e.g., wireless device 952). However, the communication signal 955, when transmitted, may also produce interference to wireless devices located in other sectors, including wireless devices in sector 916 (e.g., wireless device 951). In a similar manner, operation of the communication network associated with communication source 950 may be susceptible to interference from a communication signal or data stream (e.g., MIMO data stream 923) transmitted by access node 920 in section 918 as well as a communication signal or data stream (e.g., MIMO data stream 921) transmitted by access node 920 in sector 916.

Access node 920 may be any network node configured to provide communication between end-user wireless devices and a communication network such as the internet. Further, by virtue of comprising a plurality of antenna elements included as part of the antenna arrays as further described herein, access node 920 can simultaneously transmit each of a plurality of different MIMO data streams, such as MIMO data stream 921 in sector 916, MIMO data stream 922 in sector 917, and MIMO data stream 923 in sector 618. Moreover, it is noted that while one MIMO data stream is disclosed per sector, any number of MIMO data stream within sectors in any combination can be implemented depending on the configuration of access node 920.

In some embodiments, more than one access node may be incorporated and used in conjunction with the plurality of antenna arrays in order to deploy communication in the sectors 916, 917, 918. For example, a first antenna array including a plurality of antenna elements may be coupled to a first access node and configured to deploy a first sector 916 (within which a corresponding MIMO stream may further be deployed using techniques such as, for example, beamforming, etc.), a second antenna array including a plurality of antenna elements may be coupled to a second access node and configured to deploy a second sector 917, and a third antenna array including a plurality of antenna elements may be coupled to a third access node and configured to deploy a third sector 918. For purposes of the description, access node 920 may refer to a single physical access node device or to a plurality of physical access node devices intended to operate collectively and cooperatively to deploy a sectorized wireless network.

Access node 920 operates in a manner similar in most aspects of for access node 310 described in FIG. 3 or access node 110 described in FIG. 1. For example, access node 920, along with a processor or processing node (not shown) included internally or externally, may be configured to identify an undesired signal originating from additional communication source 950, determine that a signal parameter value of the undesired signal exceeds a threshold value, and adjust an operating parameter of one of the antenna arrays in access node 920 when it is determined that the signal parameter value exceeds a threshold value.

In some embodiments, the undesired signal may be identified using some initial measurements or some other form of characterization for all signals received by one or more of the antenna arrays in access node 920. The undesired signals may be identified using some form of mathematical or statistical process or by a process of elimination in terms of identifying all signals associated with the wireless network served by access node 920. The identification of the undesired signal may also be provided to the system as input data, either initially or on an ongoing basis, that includes information regarding signals and proximate networks in the region or area covered by the wireless network.

In some embodiments, the undesired and potentially interfering signal may further be identified by an antenna array that is different from the antenna array that is adjusted. For example, an undesired and potentially interfering signal may be identified in access node 920 at an antenna array deployed for covering sector 918. However, based on the operation and signal transmission characteristics of sectors 918 and 916 as well as measurements made for signals received by the antenna array deployed for covering sector 916, the antenna array deployed for covering sector 916 is adjusted by access node 920. Such a capability may be important due to the difference in susceptibility to interference from the signal transmitted from additional communication source 950 and the susceptibility to interference of signals in the wireless network served by additional communication source 950 from signals transmitted from access node 920 through any one of the antenna arrays deployed for covering sectors 916, 917, 918.

It is important to note that adjusting the operating parameter of the portion of the multi-element antenna, such as by reducing the number of elements used in the portion of the multi-element antenna, can result in mitigation or elimination of interference to the operation of the communication device external to the wireless network due to the transmission of signals from the system or apparatus in the wireless network.

Figure 10:
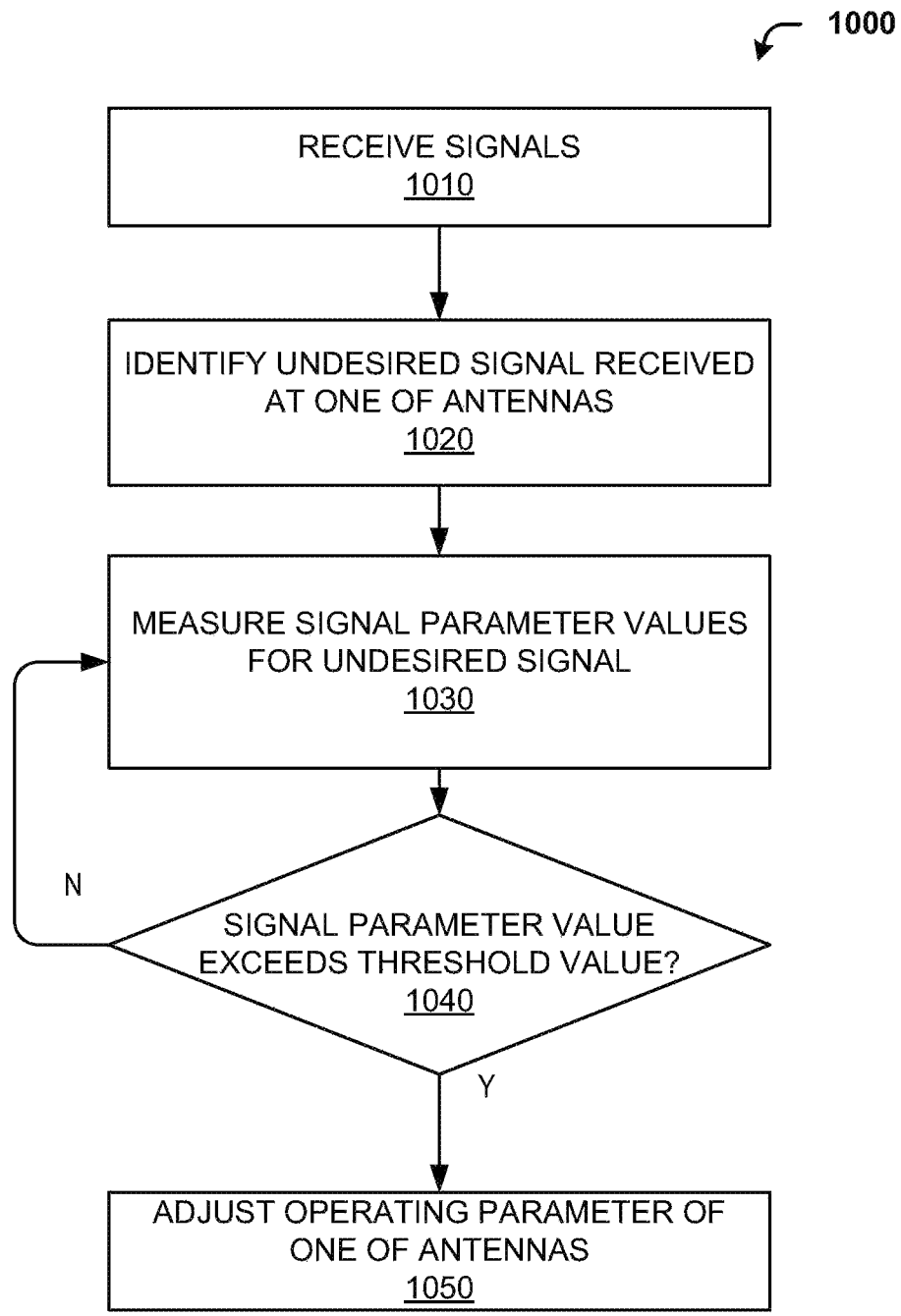
FIG. 10 depicts another exemplary process for managing transmission characteristics in wireless networks, such as networks configured to utilize MIMO.

FIG. 10 depicts another exemplary process 100 for managing signal transmission characteristics in wireless networks. Process 1000 is primarily described with respect to access node 910. Process 1000 may equally be implemented as part of access node 310 or access node 110. In other embodiments, process 1000 can be implemented with any suitable network element configured to utilize MIMO operation, such as SU-MIMO, MU-MIMO, and massive MIMO using any form of MIMO. Although process 1000 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At step 1020, a plurality of signals are received at one or more of the antenna arrays in access node 920. The plurality of signals may include communication signals associated with the wireless network (e.g., MIMO data streams 921, 922, 923). The plurality of signals may also include communication signals of the same type delivered in the wireless network but associated with neighboring communication systems or wireless networks and cooperatively coupled with the wireless network. The plurality of signals may also include one or more signals from other communication networks operating in the same area or vicinity as the wireless network, including a signal transmitted from additional communication source 950 (e.g., signal 955). Also if needed, at step 1020, initial measurements or some other form of characterization for all of the received signals may be performed as have been described above.

At step 1020, a signal originating from an additional communication source, such as additional communication source 950 described in FIG. 9, is identified. Additional communication source 950 is not associated with the wireless communication network served by access node 920 and is therefore any signals (e.g., signal 955) can be considered an undesired signal or interference signal. Similarly, any signals (e.g., data streams 921, 922, and/or 923) associated with the communication network served by access node 920 may be considered undesired or interfering signals to the communication network served by additional communication source 950.

In some embodiments, the undesired signals may be identified, at 1020, using some form of mathematical or statistical process based on any initial measurements performed at step 1010 or by a process of elimination in terms of identifying all signals associated with the wireless network served by access node 920. The identification of the undesired signal may also be provided to the system as input data, (either initially or on an ongoing basis) regarding signals and proximate networks in the region or area covered by the wireless network.

In some embodiments, the undesired and potentially interfering signal may further be identified, at step 1020, by an antenna array that is different from the antenna array that is adjusted. Identifying the undesired and potentially interfering signal by a different antenna array may help account for the difference in susceptibility to interference from the signal transmitted from an additional communication source and the susceptibility to interference of signals in the wireless network served by additional communication source from signals transmitted for the wireless network served by access node 920.

At step 1030, one or more measurements of one or more signal parameters of the interfering signal identified at step 1020 are performed to determine one or more signal parameter values for the one or more signal parameters. These measurements, at step 1020, may be performed by access node 920 or in other components in the system (e.g., a controller node not shown). The measurement, at step 1030, may alternatively or additionally include receiving additional information or data pertaining to the one or more signal parameter values.

In some embodiments, one or more values of a plurality of signal parameters may be measured, at step 1030, in access node 920 or in other components. A plurality of values of the same signal parameter, measured or received over a period of time, may be further stored (e.g., in a memory in access node 920) for use in a later step of process 1000. Further, the period of time may be predefined or user selectable within a specific range of time. The period of time may include measuring or receiving the signal parameters on a random basis or a periodic basis during the period of time. Further, the same period of time determination mechanism may be used with more than one signal parameter simultaneously if necessary.

At step 1040, a determination is made as to whether the one or more signal parameters values measured at step 1043 exceeds a threshold value. The determination, at step 1030 may further incorporate some form of statistical analysis with any of the signal parameter values for any of the signal parameters measured at step 1030. Additionally, some of these signal parameter values may be retrieved from storage (e.g. from a memory in access node 920) performed at step 1030. One or more statistical values may be determined or calculated from any signal parameter values taken, measured, or received over a period of time. Any or all of these statistical values may be provided as the final signal parameter value or values used in determining that one or more signal parameter values exceeds the threshold value.

If, at step 1040, the determined value for the one or more signal characteristics exceeds the threshold value, then, at step 1050, an operating parameter of one of the antennas, such as one of the antenna arrays in access node 920, is adjusted. In some embodiments, the adjusting of one of the antennas at step 1050 includes reducing the number of elements of the antenna that are used for transmitting a signal, receiving a signal, or both transmitting and a receiving a signal using a communication protocol (e.g., 5G) in the wireless communication network associated with and served by access node 910. Further, in some embodiments, the number of elements is reduced by a factor that is a multiple of two. It is important to note that any other adjustments may be made to the one antenna including those variations described in any of the embodiments above.

Further, after completion of adjusting the operating parameter of one of the antennas (e.g., an antenna array in access node 920) at step 1050, process 1000 may return, as necessary, to measuring, at step 1030 and determination, at step 1040. If the signal parameter values are determined, at step 1040, to still be above the threshold, then process 1000 continues to further adjust the operating parameter of the one antenna, at step 1050.

If, at step 1040, the value for the one or more signal characteristics does not exceed the threshold value, then process 1000 returns to step 1030 in order to continue measuring and determining signal parameter values. In some embodiments, looping back to measuring at step 1030 may be performed continuously. In some embodiments looping back includes only periodically executing the measuring, at the step 1020. For instance, the step of measuring at step 1030 may be performed at one minute intervals.

It is important to note that more than one undesired and potentially interfering signal may be identified. Further, an additional undesired and potentially interfering signal may be identified during any operation of process 1000. It is to be understood that any additional identified and potentially interfering signal may be evaluated in process 1000 either in combination with all other undesired signals or as separate process threads of process 1000, for instance starting with identifying an undesired signal, step 1020.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid-state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

Although embodiments which incorporate the teachings of the present disclosure have been shown and described in detail herein, those skilled in the art can readily devise many other varied embodiments that still incorporate these teachings. Having described preferred embodiments of systems and methods for managing signal transmission characteristics in a wireless network (which are intended to be illustrative and not limiting), it is noted that modifications and variations can be made by persons skilled in the art in light of the above teachings. It is therefore to be understood that changes may be made in the particular embodiments of the disclosure disclosed which are within the scope of the disclosure as outlined by the appended claims.

What is claimed is:

1. A method comprising:
   identifying an undesired signal, the undesired signal originating from a communication device external to a wireless network, the wireless network utilizing an access node deploying a multi-element antenna configured to operate in a Multiple-Input Multiple-Output (MIMO) operating mode, the multi-element antenna comprising a first portion having a first set of elements for communicating on the wireless network using a first communication standard and a second portion having a second set of elements using a second communication standard different from the first communication standard;
   determining that a signal parameter value of the undesired signal exceeds a threshold value; and
   adjusting an operating parameter of the multi-element antenna for communicating signals in the wireless network when it is determined that the signal parameter value exceeds the threshold value, wherein adjusting the operating parameter of the multi-element antenna comprises reducing a number of elements in the first set of elements that are operating for at least of one of transmitting and receiving signals using the first communication standard, wherein the first communication standard is a fifth generation communication standard, thereby mitigating interference to operation of the communication device external to the wireless network.

2. The method of claim 1, wherein the first communication standard is a fifth generation mobile networks or wireless systems standard.

3. The method of claim 1, wherein the second set of elements is different from the first set of elements and is used for communication on the wireless network using a second communication standard different from the first communication standard.

4. The method of claim 1, wherein reducing the number of elements comprises reducing the number of elements in the first set of elements by a factor of a multiple of two.

5. The method of claim 4, wherein the multi-element antenna comprises 64 elements, the number of elements in the first set of elements is 32 elements operating for at least one of transmitting and receiving signals using the first standard, a number of elements in the second set of elements is 32 antenna elements operating for at least one of transmitting and receiving using the second standard, and the reduced number of elements in the first set of elements is 16 elements operating at least one of transmitting and receiving using the first standard.

6. The method of claim 1, wherein the determining that the signal parameter value of the undesired signal exceeds the threshold value comprises determining a set of signal parameter values taken over a period of time.

7. The method of claim 6, wherein the determining the set of signal parameter values taken over a period of time comprises determining a statistical value for the set of signal parameter values and providing the statistical value as the signal parameter value.

8. The method of claim 1, wherein the signal parameter is at least one of received signal strength for the undesired signal, signal frequency, and signal bandwidth.

9. The method of claim 1, wherein the multi-element antenna is one of a set of multi-element antennas, each multi-element antenna in the set covering a radial sector outward from a fixed location.

10. The method of claim 9, wherein identifying the undesired signal comprises identifying the undesired signal using a multi-element antenna in the set of multi-element antennas that is different from the multi-element antenna that is adjusted.

11. A system comprising:
an access node, the access node including one or more multi-element antennas configured to operate in a Multiple-Input Multiple-Output (MIMO) operating mode for communicating in a wireless network, each multi-element antenna comprising a first portion having a first set of elements for communicating on the wireless network using a first communication standard and a second portion having a second set of elements using a second communication standard different from the first communication standard; and
a processing node coupled to the access node, the processing node identifying an interference signal, the interference signal originating from a communication device external to the wireless network, determining that a signal parameter value of the interference signal is above a threshold value, and providing a signal to the access node for adjusting an operating parameter of one of the one or more multi-element antennas for communicating signals in the wireless network when it is determined that the signal parameter value exceeds the threshold value, wherein adjusting the operating parameter of the multi-element antenna comprises reducing a number of elements in the first set of elements that are operating for at least of one of transmitting and receiving signals using the first communication standard, wherein the first communication standard is a fifth generation communication standard, thereby mitigating interference to operation of the communication device external to the wireless network.

12. The system of claim 11, wherein the processing node further determines whether at least one signal parameter value of a set of signal parameter values taken over a period of time exceeds the threshold value.

13. A processing node comprising:
a processor configured to:
identify an undesired signal, the undesired signal originating from a communication device external to a wireless network, the wireless network having an access node deploying a multi-element antenna configured to operate in a Multiple-Input Multiple-Output (MIMO) operating mode, the multi-element antenna comprising a first portion having a first set of elements for communicating on the wireless network using a first communication standard and a second portion having a second set of elements using a second communication protocol standard different from the first communication standard;
determine that a signal parameter value of the undesired signal is above a threshold value; and
provide instructions for adjusting an operating parameter of the multi-element antenna for communicating signals in the wireless network when it is determined that the signal parameter value exceeds the threshold value, wherein adjusting the operating parameter of the multi-element antenna comprises reducing a number of elements in the first set of elements that are operating for at least of one of transmitting and receiving signals using the first communication standard, wherein the first communication standard is a fifth generation communication standard, thereby mitigating interference to operation of the communication device external to the wireless network.

14. The processing node of claim 13, wherein the processing node is operated in a system for the wireless network that deploys a fifth generation mobile networks or wireless systems standard as the first communication standard.

* * * * *